Aug. 6, 1940.　　　　K. E. BEMIS　　　　2,210,521

COMBINED COOKING, BAKING, AND SERVING UNIT

Filed July 29, 1939

Inventor
Kenneth E. Bemis
By Philip A. Rundell
Attorney

Patented Aug. 6, 1940

2,210,521

UNITED STATES PATENT OFFICE 2,210,521

COMBINED COOKING, BAKING, AND SERVING UNIT

Kenneth E. Bemis, Oakland, Calif.

Application July 29, 1939, Serial No. 287,322

9 Claims. (Cl. 53—6)

This invention combines in a single stackable unit, a complete cooking, baking and serving unit, and incorporates heat maintenance features for keeping the foods hot both before, and following service of the foods, and the units are stackable, one upon the other when each is filled with a complete meal and so constructed as to maintain the bottoms of the dishes of a superposed unit out of contact with the foods contained in the supporting unit, and a stacked series of units are directly deliverable from the cooking, baking and heating operations, to a group of guests.

In view of the fact that there is no transfer of foods from the original dishes in which the foods are baked, cooked or heated, but that the foods are served in these original dishes, and that each meal is protected against the cooling effect of air until served, and that the complete meal is delivered in a single unit directly to the guest, and that the natural juices of the foods are delivered in their entirety with the foods, the most efficient service and most delectable results are assured. A hot meal is a reality, and annoyance to the guest, such as when dish after dish is set before him, is completely obviated.

In the usual method of serving foods, the various foods are cooked in regular cooking dishes, after which the cooked foods are transferred to serving dishes such as plates and sauce dishes, and placed on a tray and carried to the table occupied by the guest, during which time air and insects have complete access to the foods on the dishes; the air cooling the foods rapidly, and the presence of insects under such conditions not being conducive to the promotion of appetite. Upon reaching the table, the dishes are removed from the tray, one by one, and set before the guests, and it often occurs that by the time the food is all served it is just about lukewarm.

In the case of steaks, chops, and similar foods, the natural juices have been left in the frying pan or on the griddle. Furthermore, more than one or two full services cannot be served at one time, thus requiring several trips to serve a party of four to six guests, the first served usually waiting until the others have been served, by which time their food is practically cold.

It is the object of this invention to serve the foods directly in the dishes in which they have been baked, heated or cooked, thus serving the natural juices directly with the food, and to serve a complete meal in a single serving unit, and to so form these units that they can be stacked one upon the other, and when so stacked, that the upper serving dishes protect the foods in the respective lower units against insects and dust, as also from air and its cooling effect until the units with their contained complete meals are placed before the guests, and that these units when stacked, while clearing the foods in the next lower unit, will preserve the heat of the foods therein, and which units following serving, will still maintain the heat of the foods by forming a dead air space between the table and the bottoms of the respective dishes in the unit; and which serving units, due to their stacking feature, can be served simultaneously to an entire party of guests.

In describing the invention, reference will be made to the accompanying drawing, in which.

Figure 1:
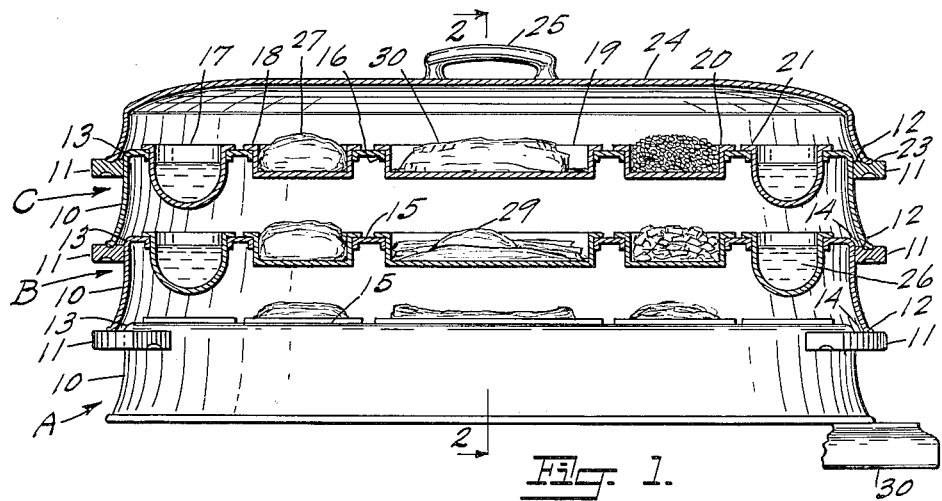
Fig. 1 is a longitudinal sectional elevation through the invention, and illustrating three units with complete meals stacked, and with the top unit covered, and all ready to deliver directly to, and to serve three guests; and in which the lower unit is illustrated in full view.
Figure 2:
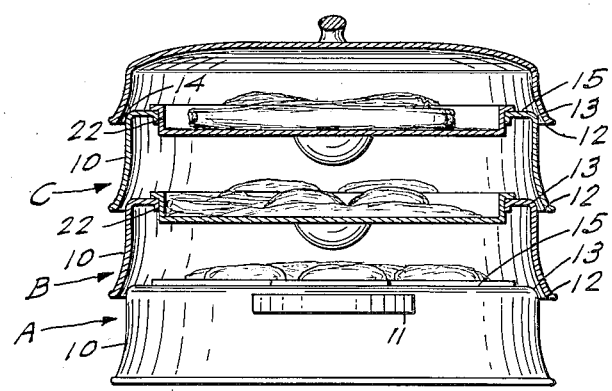
Fig. 2 is a transverse section taken on line 2—2 of Fig. 1.

The invention consists of a plurality of units, each of which consists of a frame 10 having a handle 11 mounted at each end in a position in which the bottom 12 of a unit rests thereon and preferably just clears the top peripheral edge 13 of the next lower unit to leave a space 14 through which steam and vapor issuing from the hot foods can escape to prevent steaming of other foods which should preferably be kept dry. Very little clearance is actually required, and if steaming is not objectionable, this vent space can be dispensed with.

The frame 10 is open at the bottom or in other words, is bottomless, and has uninterrupted side walls, and has preferably a plane top 15 with flanged-down openings 16 to receive the respective dishes 17 to 21, these dishes preferably having perpendicular side walls 22 to obviate slipping, sliding or tipping.

The side or peripheral walls of the frame 10 are sufficiently high relative to the depth of the dishes 17 to 21 as to keep the dishes out of contact with the foods in the unit on which it is stacked.

A groove 23 formed in the top of each handle is adapted to receive the bottom edge of the frame above and thus center it and thereby stabilize the stack of units, and also to insure uniform spacing 14 for escape of steam.

An empty unit, that is, one with empty dishes in place, can be used as a cover for a stack of units in lieu of the cover 24 which has its peripheral walls formed at the lower end to conform with the lower ends of the unit frames, and this cover is provided with a handle 25.

In use, one of the frames A is placed in suitable position and cups 17 and 21 filled with butter, syrup or other products 26 are placed in their respective openings and are supported by their flanges. Biscuits 27, when they are to be served, are baked directly in one of the pans, as 18, and the hot pan with the hot biscuit which has just been removed from an oven operating on the principle of that disclosed in my copending application Serial Number 202,912, filed April 19, 1938, for Baking and cooking oven, is placed in its opening in the frame and the pan is supported by its flanges as shown. Beans 28 or other pre-cooked foods are placed in another dish 20 and placed on the stove or hot plate to heat thoroughly and then transferred to the frame, and eggs 29, steaks, chops, hamburger, ham and similar foods are placed in another pan 19 and cooked directly therein and when cooked, the pan with its cooked product and all of the juices, is placed directly in its opening, completing one meal service with all dishes and foods piping hot, and completing the sealing of the top of the unit.

An empty unit B is placed on top of the first unit A and the foods which are prepared in the second set of pans are placed in the second frame, followed by the remainder of the services as C, and after the last unit is completed and all are stacked, an empty unit or the cover 24 is placed on top. In the meantime, steam or vapor issuing from the foods escapes through the vent passage 14.

The stacked group of units is then carried by the handles of the lowermost unit A and the entire stack is set in front of the first guest. The handles of the second unit B are then used to transfer the remainder of the stack, B and C, to the next guest; the handles of the third unit C are then used to transfer the remaining unit C to the third guest, and so on until all of the guests of a party, or an entire table of guests are served, the cover consisting of the empty unit or the cover 24 being removed when the last unit is served, and thus providing fast, simultaneous, unusually efficient and non-interfering and non-annoying service.

As each unit is placed upon the table 30, a dead-air space is formed between the top of the table and the bottom of the dishes, thus preserving the heat, and since the frame keeps all dishes out of contact with the table, the table or its coverings will not be marred or damaged.

Obviously, this stacking feature can be incorporated into many different types of serving apparatus, and it will be understood that variations in construction and arrangement of parts, which variations are consistent with the appended claims may be resorted to without detracting from the spirit or scope of the invention, or sacrificing any of the advantages thereof.

I claim:

1. A stack of duplicate serving units, each unit comprising a frame having a top and dishes included therein; a support; and supporting means supportable on the support of the duplicate unit therebelow and spacing the undersurface of the said dishes in one unit above the top of foods disposed in said duplicate unit therebelow, with each unit containing a complete meal, whereby a number of said units, each with a complete meal service excepting the cover unit, are stackable in a vertical tier for direct and simultaneous service to a plurality of guests, and in which said supporting means consists of side walls terminating at the bottom in a supporting edge, and in which said support consists of a handle at each end of each unit with the supporting edge of one unit supported on the handles of the next unit therebelow.

2. A stack of duplicate serving units, each unit comprising a frame having a top and dishes included therein; a support; and supporting means supportable on the support of the duplicate unit therebelow and spacing the undersurface of the said dishes in one unit above the top of foods disposed in said duplicate unit therebelow, with each unit containing a complete meal, whereby a number of said units, each with a complete meal service excepting the cover unit, are stackable in a vertical tier for direct and simultaneous service to a plurality of guests, and in which said frame has imperforate side walls terminating in a bottom edge and forming said supporting means and in which said bottom edge slightly clears of the peripheral edge of the top of the duplicate unit therebelow on which it is stacked to permit escape of steam and vapor, and forming a heat retaining chamber between the stacked units until the units are served, and thereafter forming a dead air space in cooperation with a table upon which the unit is supported to maintain the heated condition of the foods in the dishes in the unit.

3. A stack of duplicate serving units, each unit comprising a frame having a top and dishes included therein; a support; and supporting means supportable on the support of the duplicate unit therebelow and spacing the undersurface of the said dishes in one unit above the top of foods disposed in said duplicate unit therebelow, with each unit containing a complete meal, whereby a number of said units, each with a complete meal service excepting the cover unit, are stackable in a vertical tier for direct and simultaneous service to a plurality of guests, and in which said top consists of a support having openings therein to receive said dishes; said dishes being removable and replaceable for sequential use as cooking devices and serving dishes, and forming means for sealing said top; and in which said supporting means consists of side walls terminating at the bottom in a supporting edge, and in which said support consists of a handle at each end of the frame and mounted adjacent the top of the frame and projecting from the side walls thereof.

4. A serving unit comprising a bottomless shell having a top including a plurality of food compartments having a total cross-sectional depth including the bottom walls thereof less than half of the height of said serving unit, and with the lower end of said shell conforming internally to the peripheral edge of the top, and including supports adjacent the top of the shell to permit stacking of a plurality of units with the bottoms of the food compartments supported in spaced relation to the top of foods contained in the compartments of a duplicate unit on which it is supported, and in which said shell has imperforate side walls and in which said supports consist of a handle at each end of the shell, and in which said lower end is supportable on said handles of the duplicate unit with said lower end slightly clearing said top to permit escape of steam or vapor while maintaining the heat of the food in the duplicate unit; and a cover for said serving unit.

5. A serving unit comprising a bottomless shell having a top including a plurality of food compartments having a total cross-sectional depth including the bottom walls thereof less than half of the height of said serving unit, and with the lower end of said shell conforming internally to the peripheral edge of the top, and including supports adjacent the top of the shell to permit stacking of a plurality of units with the bottoms of the food compartments supported in spaced relation to the top of foods contained in the compartments of a duplicate unit on which it is supported, and in which said shell has imperforate side walls and in which said supports consist of a handle at each end of the shell, and in which said lower end is supportable on the handles of a duplicate unit with said lower end slightly clearing said top to permit escape of steam or vapor while maintaining the heat of the foods in the duplicate unit; and a cover for said serving unit, and in which said handles each include means for cooperation with the lower end of a superposed unit supported thereon for centering the stacked units one relative to the other.

6. A serving unit comprising a bottomless shell having a top including a plurality of food compartments having a total cross-sectional depth including the bottom walls thereof less than half of the height of said serving unit, and with the lower end of said shell conforming internally to the peripheral edge of the top, and including supports adjacent the top of the shell to permit stacking of a plurality of units with the bottoms of the food compartments supported in spaced relation to the top of foods contained in the compartments of a duplicate unit on which it is supported, and in which said shell has imperforate side walls and in which said supports consist of a handle at each end of the shell, and in which said lower end is centerable relative to said top through the medium of a groove formed in the top of each handle.

7. A stack of duplicate serving units, each unit comprising a bottomless shell having imperforate side walls and a top having a plurality of dish-receiving openings therein and a flanged dish having perpendicular side walls to prevent tipping or slipping and supportable in each opening with the bottoms of the dishes projecting down into the shell when supported in said openings a distance less than one-half the height of the shell to support the bottoms of the dishes out of contact with the foods contained in dishes in the duplicate unit on which it is stackable; said dishes initially functioning as cooking, baking and heating dishes while removed from the shell and finally functioning as serving dishes when supported in the openings in said top, for direct service of foods cooked, baked or heated therein to a guest; the lower end of said side walls conforming in size and shape to the periphery of said top; and a handle for each end of the shell and mounted upon the upper portion of said side walls and forming a support for the duplicate serving unit stacked thereon; said duplicate unit functioning as a cover for said serving unit and forming a chamber for maintaining the heat of said foods until served, and said bottomless shell with its associated dishes forming a dead air space for conservation of heat when said shell is supported on a table.

8. Duplicate stackable units, each unit comprising a bottomless shell having a top including a series of dishes for serving a meal; said shell terminating at its lower edge in a plane below the bottoms of said dishes; said shell including supports at its upper end for supporting a duplicate unit thereon and being supportable by its lower edge on a duplicate unit therebelow with the bottoms of the dishes in said unit supported in clearing relation to foods contained in the dishes in the duplicate unit therebelow on which it is supported, and in which said supports consist of a handle mounted at each end of said shell adjacent to said top and including means for centering a duplicate shell supported thereon.

9. Stackable, combined cooking and serving units comprising each a bottomless frame having imperforate side walls with the inner periphery of the bottom edge conforming to the exterior periphery of the top; a top supported by said side walls and having a plurality of openings, and a dish relatively immovably supported in each opening and manually removable and replaceable for sequential use as cooking dishes, and as serving dishes in combination with said frame; said frame having a handle at each end provided with a groove in registrable alignment with said bottom edge for centering and supporting a duplicate unit forming a cover for said combined cooking and serving unit.

KENNETH E. BEMIS.